J. D. THROOP.
STEAM VALVE.
APPLICATION FILED NOV. 16, 1906.

916,629.

Patented Mar. 30, 1909.

WITNESSES:

John D. Throop,
INVENTOR.

By C. A. Snow & Co.
ATTORNEYS

UNITED STATES PATENT OFFICE.

JOHN D. THROOP, OF DETROIT, MICHIGAN.

STEAM-VALVE.

No. 916,629.　　　　Specification of Letters Patent.　　Patented March 30, 1909.

Application filed November 16, 1906.　Serial No. 343,756.

*To all whom it may concern:*

Be it known that I, JOHN D. THROOP, a citizen of the United States, residing at Detroit, in the county of Wayne and State of Michigan, have invented a new and useful Steam-Valve, of which the following is a specification.

The present invention relates to a valve of that type requiring no stuffing box or packing around the stem where it passes through the casing.

The invention has for one of its objects to provide a valve of this character in which the parts are of comparatively simple and inexpensive construction and designed to be quickly and conveniently assembled or taken apart, and to be thoroughly reliable and efficient in operation.

A further object of the invention is the provision of a valve having a ground joint between the valve stem and bonnet of the casing, and a spring for holding the parts tightly seated with a ball bearing between the spring and bonnet so as to permit the spring to be rotated with comparatively little friction.

Another object is to construct the valve with a non-longitudinally movable valve stem which operates through a nut to move the valve toward or away from its seat, a flexible joint being provided between the nut and valve for facilitating the proper seating of the latter.

With these objects in view, and others, as will appear as the nature of the invention is better understood, the invention comprises the various novel features of construction and arrangement of parts, which will be more fully described hereinafter and set forth with particularity in the claim appended hereto.

Figure 1:
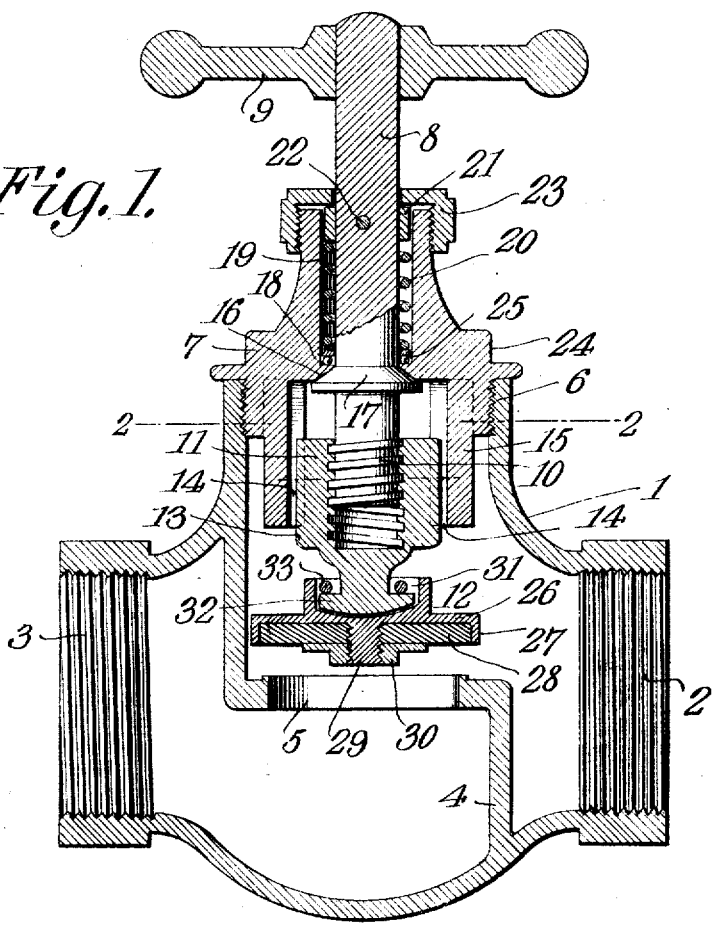
Figure 2:
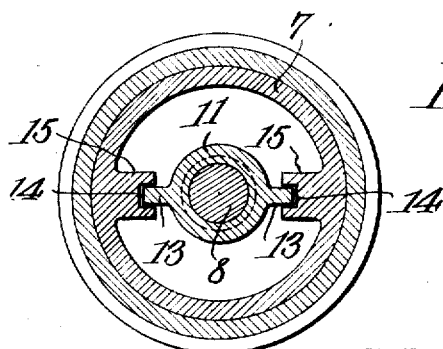

In the accompanying drawing, which illustrates one of the embodiments of the invention, Figure 1 is a central vertical section of the valve. Fig. 2 is a transverse section taken on line 2—2, Fig. 1.

Corresponding parts in the several figures are indicated throughout by similar characters of reference.

Referring to the drawing, 1 designates the valve casing which is of ordinary construction having a tapped inlet opening 2 and an outlet opening 3, and provided with a partition 4 having a port 5. The top of the valve casing is open and provided with an interior thread at 6 for receiving the bonnet 7. Extending through the bonnet 7 is the rotatable valve stem 8 provided at its upper end with a hand wheel 9 suitably secured thereto and having at its lower end a square screw thread 10. Engaging the thread 10 is a non-rotatable nut 11 to which the valve 12 is attached. The nut 11 is provided with two diametrical longitudinally extending wings or ribs 13 which slidably engage in vertically extending grooves 14 provided in the guides or depending projections 15 on the inner end of the bonnet 7. By this means, the nut is prevented from rotating, but is free to move vertically as the stem 8 is rotated.

In order to dispense with the usual packing rings, or stuffing box, a conical seat 16 is formed on the bonnet adjacent the bottom thereof with which coöperates a conical enlargement 17 on the valve stem. The seat and enlargement are carefully ground, so that the joint between them will be perfectly fluid tight. An annular shoulder 18 is provided at the lower end of the bore 19 of the bonnet just above the seat 16, which shoulder forms an abutment for the lower end of the helical compression spring 20 that is disposed in the bore 19 and around the valve stem. The abutment for the upper end of the spring is formed by a collar 21 removably secured to the stem by the pin 22. Arranged on the top end of the bonnet is a screw cap 23, the periphery of which is non-circular, as is also the periphery of the bonnet at 24, for the reception of the wrench. Interposed between the shoulder 18 and the lower end of the spring 20 is a ball bearing 25 for permitting the spring to move with the valve stem without undue friction at the shoulder 18. By this arrangement, the spring 20, which is normally under a suitable tension, holds the annular enlargement 17 on the valve stem tightly against the seat 16, thus forming a seal or packing for preventing the escape of steam or other fluid, and at the same time permitting the valve stem to rotate freely.

The valve proper, designated by 12, comprises a disk-shaped body 26 having a cylindrical depending flange 27 forming, with the bottom side of the body, a holder for the leather ring or other packing 28. The body is provided with a central threaded stud 29 extending downwardly through the packing ring 28 and receiving a nut 30 for holding the packing in place. On the top of the body 26 is a hollow boss 31 into which extends the head 32 formed on the lower end of the nut 11. The bottom of the hollow boss is slightly concave, and the bottom surface of the head is slightly convex, so that the valve will be capable of having a limited curvilinear movement on the nut independently of the latter, so that the valve can be properly seated on the port 5. The valve is supported on the head 32 in any suitable manner, as, for instance, by means of pins 33 extending through the boss 31 and engaging on the top side of the head of the nut. By this construction, a flexible joint is provided between the valve and the actuating nut 11 which permits the valve to seat properly and to rock independently of the nut, as when the former is almost seated or in frictional engagement with its seat.

From the foregoing description, taken in connection with the accompanying drawing, the advantages of the construction and of the operation will be readily understood. The operation of the valve is attended with practically no leakage, and since no packings are employed, wear of the valve is extremely small. The parts are so designed that they can be readily assembled or disassembled for the purpose of inspection, renewal or repair of the valve as occasion requires.

I have described the principle of operation of the invention, together with the apparatus which I now consider to be the best embodiment thereof, but I desire to have it understood that the apparatus shown is merely illustrative, and that various changes may be made, when desired, as are within the scope of the invention.

What is claimed is:—

In a valve, a casing having a port, a stem, a bonnet having a conical seat and a shoulder above the seat, a conical enlargement on the stem engaging the seat, a spring in the bonnet and extending around the stem, antifriction bearings between one end of the spring and the shoulder of the bonnet, a collar on the stem to form an abutment for the other end of the spring, a screw on the stem, a member actuated by the screw to move in a direction longitudinally thereof, a valve having a rocking connection with the member and coacting with the port, and means on the bonnet for guiding the movement of the member.

In testimony that I claim the foregoing as my own, I have hereto affixed my signature in the presence of two witnesses.

JOHN D. THROOP.

Witnesses:
W. W. SMITH,
JULIA KEATS.